United States Patent [19]
Dearman et al.

[11] Patent Number: 5,411,224
[45] Date of Patent: May 2, 1995

[54] GUARD FOR JET ENGINE

[76] Inventors: Raymond M. Dearman, Five Bellwood Dr., Hattieburg, Miss. 39402; John J. Bethea, P.O. Box 83, Hattiesburg, Miss. 39403

[21] Appl. No.: 215,316

[22] Filed: Mar. 21, 1994

Related U.S. Application Data

[63] Continuation-in-part of Ser. No. 45,503, Apr. 8, 1993, abandoned.

[51] Int. Cl.$^6$ .............................................. B64D 33/02
[52] U.S. Cl. ................................ 244/53 B; 60/39.092; 55/306
[58] Field of Search ................... 244/53 R, 53 B, 121, 244/1 R; 60/39.092; 55/306

[56] References Cited

U.S. PATENT DOCUMENTS

| | | | |
|---|---|---|---|
| 2,663,993 | 12/1953 | Mosser | 60/35.6 |
| 2,944,631 | 7/1960 | Kerry et al. | 183/62 |
| 2,969,941 | 1/1961 | Hobart, Jr. | 244/53 |
| 3,121,545 | 2/1964 | Meletiou | 244/53 |
| 3,196,598 | 7/1965 | Olson | 55/306 |
| 3,426,981 | 2/1969 | Allcock | 244/1 |
| 3,871,844 | 3/1975 | Calvin, Sr. | 55/306 |
| 4,149,689 | 4/1979 | McDonald | 244/53 |
| 4,153,223 | 5/1979 | Romer et al. | 244/3.1 |

FOREIGN PATENT DOCUMENTS

| | | | |
|---|---|---|---|
| 0272995 | 11/1908 | Japan | 416/247 R |
| 0297394 | 11/1989 | Japan | 244/53 B |

*Primary Examiner*—Galen L. Barefoot
*Attorney, Agent, or Firm*—Pravel, Hewitt, Kimball & Krieger

[57] ABSTRACT

A guard apparatus for the intake of a jet engine includes a generally conically shaped structure that has a plurality of concentric rings of gradually decreasing diameter beginning at a largest ring that affixes to the cowl of the jet engine and progressively smaller diameter concentric rings spaced toward the front end portion of the guard apparatus. The guard apparatus also includes a plurality of longitudinally extended rods each of which forms a structural connection with one or more of the plurality of concentric rings, the rods defining an acute angle with the central longitudinal axis of the guard. Overall, the front end portion of the guard is generally hemispherically shaped defining a generally convex front end portion of the guard apparatus. Each of the longitudinally extending rods is acircular in shape, providing a transverse section that includes a semicircular shaped rear portion and a pointed front portion. The pointed portion is defined by a pair of flat surfaces that intersect along an edge, and the angle between the two flat surfaces is an acute angle. The apparatus is preferably formed of a titanium material or titanium alloy.

5 Claims, 1 Drawing Sheet

GUARD FOR JET ENGINE

CROSS REFERENCE TO RELATED APPLICATIONS

This is a continuation-in-part of U.S. patent application Ser. No. 08/045,503, filed Apr. 8, 1993, now abandoned which is incorporated herein by reference.

BACKGROUND OF THE INVENTION

1. Field Of The Invention:

The present invention relates to protective guards and covers for jet engines and more particularly relates to an improved guard for the intake of a jet engine wherein the guard includes specially shaped titanium rods that each extend forward of the jet engine and along an inclined path that forms a thirty degree (30°) angle with the central longitudinal axis of the guard. The titanium rods are circumferentially spaced preferably less than ten degrees (10°) apart, and converge at the forward end portion of the guard.

2. General Background:

Each year, numerous accidents occur when foreign objects enter the front intake of a jet engine. Several patents have issued for aircraft engine guards, each attempting to solve this problem.

As an example, U.S. Pat. No. 2,663,993 entitled "Deicing Apparatus" discloses a screen or mesh type cover that is flat and which surrounds the inlet of an aircraft power plant. The screen or grill is heated to remove ice therefrom during use.

A forwardly extending air duct screen is described in U.S. Pat. No. 2,969,941 entitled "Air Duct Screen With Locking Device". The screen includes structural members that are disposed in a spaced apart relation and concentrically about the longitudinal axis of the overall cage or framework.

A retractable guard for an air intake of an engine is described in U.S. Pat. No. 2,944,631 entitled "Retractable Guards For Air Intakes" issued to T. H. Kerry et al. The Kerry patent discloses a guard that includes two guard portions, each of which is mounted to pivot about an axis extending across the intake duct. The guard portions are disposed to pivot between an operative position in which the guard portions are together, and extend across the entire path of fluid flowing into the duct. One edge of the guard portion co-operates with a corresponding edge of the other guard portion and another edge of each guard portion co-operates with a wall of the duct, and an inoperative position, the guard portions are removed from the path of fluid flowing through the duct. The guard portions are so shaped as to conform with the wall of the duct against which they lie in the retracted position.

An example of a rotating deflector for aircraft engines having propellers is disclosed in U.S. Pat. No. 3,121,545 issued to N. S. Meletiou and entitled "Rotary Deflector For Aircraft Engine Intakes".

U.S. Pat. No. 3,196,598 entitled "Inlet Deflector For Jet Engines" issued to W. T. Olson describes an apparatus for obstructing the entry of birds and other foreign objects into aircraft jet engines during ground and flight operations.

An air intake guard for a gas turbine engine is the subject of U.S. Pat. No. 3,426,981. The intake guard has blades of streamline section arranged either radially or transversely. The main structure of each blade is rigidly connected from steel or titanium and the nose is made of a deformable materials so as to mushroom on being struck by a large foreign body such as a bird and thereby increase the shielding area.

A screen apparatus for an air inlet is the subject of U.S. Pat. No. 3,871,844 issued to Frank F. Calvin, Sr. The screen apparatus is particularly useful for preventing ingestion of birds into aircraft jet engines. A screen extends outwardly from the air inlet of the engine to define an exterior surface providing an oblique angle relative to the nominal path of the engine through the air. Birds or other foreign objects which strike the screen are deflected away from the screen and the air inlet by the contact with the oblique angle. A solid nose cone at the forward end of the screen provides an area of relatively high air pressure which tends to deflect objects away from the straight-on impact with the screen. The apertured exterior surface of the screen apparatus has an aggregate aperture area equal to or exceeding the air inlet area of the engine to permit unimpaired engine operation.

U.S. Pat. No. 4,149,689 entitled "Protective Screen For Jet-Engine Intake" issued Apr. 17, 1979 to John McDonald. In the McDonald device, the forwardly open intake end of a jet engine is screened against birds or other airborne objects using a conical cage formed of an array of metal rods converging on the engine axis, the rods being held together at the vertex of the cone by a solid tip and in am intermediate plane as well as by the cone base by a pair of metal rings. In flight, they are free to vibrate so as to shake off adhering ice particles. Deicing can be further promoted by feeding back exhaust gases from the rear of the engine to the interior of the cage through an external pipe.

SUMMARY OF THE PRESENT INVENTION

The present invention provides an improvement over prior art guard devices used with jet engines. The apparatus includes a plurality of circumferentially spaced, longitudinally extending titanium rods, each having a cross section that is acircular. Each of the longitudinally extending titanium rods forms an angle of about thirty degrees (30°) with the central longitudinal axis of the housing which is aligned with the engine cowl. A plurality of circumferentially extending, titanium bars of differing diameter are spaced from the front end portion of the guard to the rear end portion thereof.

The circumferentially spaced titanium rods are preferably spaced apart by an angular dimension of about seven and one half degrees (7½°). The titanium bars are preferably between one eight inch (⅛") and one half inch (½") in width at the thickest part and are about one quarter inch (¼") to one half inch (½") deep when measured along a radial line.

The guard apparatus has circumferentially extending rods that are spaced at intervals from the rear to the front of the guard.

As exemplary dimensions, the overall guard apparatus can be for example, about three feet (3') in length and about four feet (4') in diameter.

The rear end portion of the guard provides a generally rounded blunt end portion having a radius of curvature that is about equal to or larger than the diameter of the overall guard. The front pointed end of each rod faces toward the front of the overall screen so that the rods provide sharp surfaces that would slice foreign objects upon impact and have neglible effect on airflow.

Each of the bars would preferably be from one eight inch (⅛") to one half inch (½") in width.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
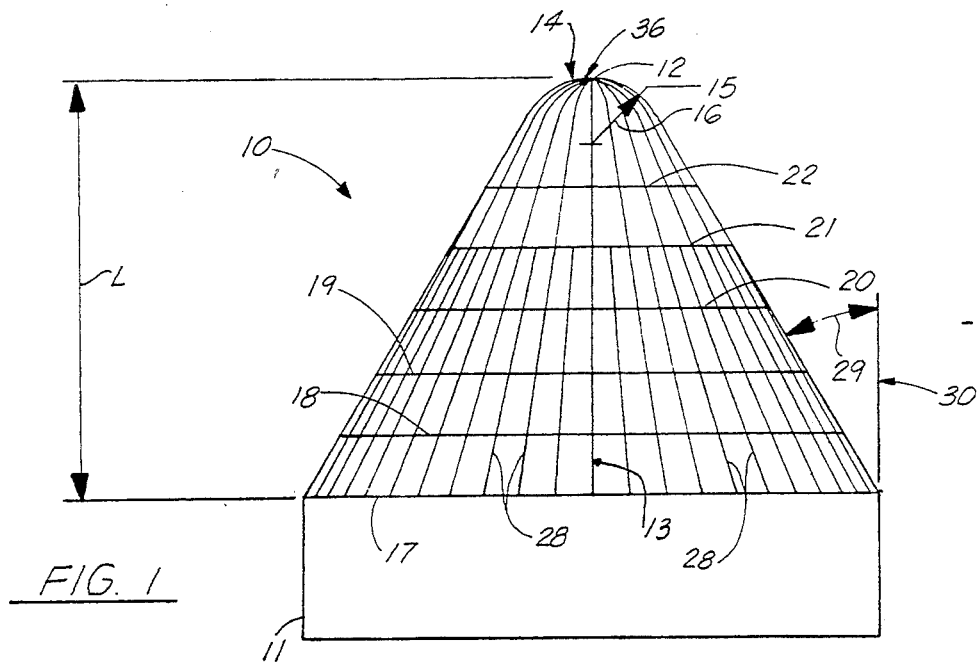
FIG. 1 is a side view of the preferred embodiment of the apparatus of the present invention.
Figure 2:
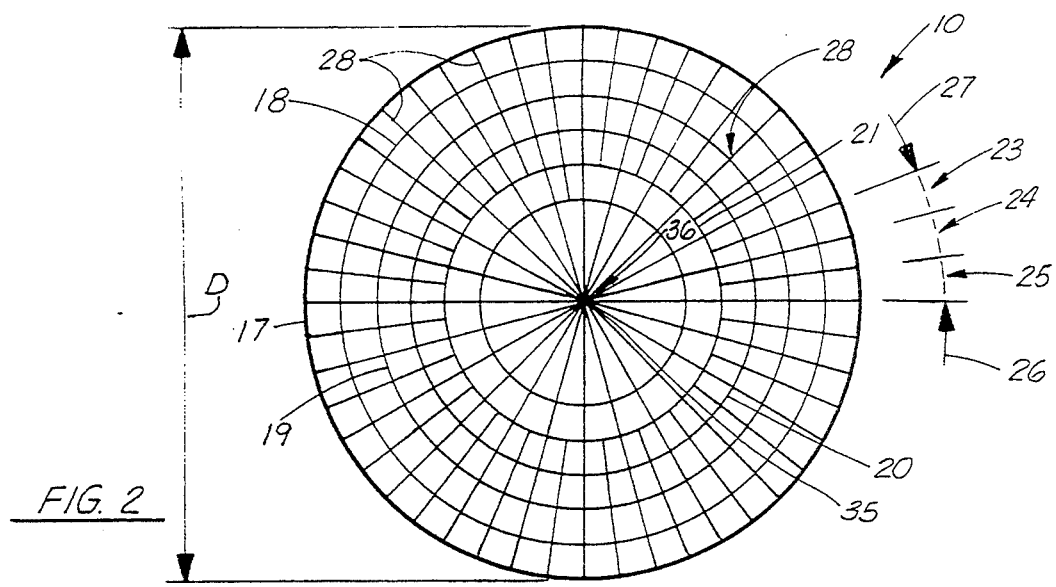
FIG. 2 is a front view of the preferred embodiment of the apparatus of the present invention.

FIGS. 1-4 show generally the preferred embodiment of the apparatus of the present invention designated generally by the numeral 10. As seen in FIGS. 1 and 2, the guard 10 includes a front 12 portion and a rear base ring portion 17 that interfaces with a jet engine cowl 11. Guard 10 provides a central longitudinal axis 13. The front portion 12 includes a convex surface 14 having a radius 15 of curvature defined by arrow 16 of, for example, six feet (6'). The overall length "L" as an example can be about three feet (3') and overall diameter "D" can be four feet (4') as an example. Within the teaching of the present invention however, the dimensions "D", "L", and radius 16 could be increased or decreased depending upon the required scale.

A circular base ring 17 in the form of a titanium rod for example forms the rear of guard 10. Ring 17 attaches to the engine cowl 11 by welding for example or other suitable means known in the art. Base ring 17 is the largest wire ring of guard 10. A plurality of progressively smaller diameter circular rings 18-22 are provided beginning with ring 18 closest to base ring 17, and ending with the smallest diameter ring 22 which is closest to the front 12 of guard 10.

The plurality of rings 17-22 are connected by welding for example to a plurality of longitudinally extending rods 28 of titanium for example. Each of the longitudinally extending rods 28 is spaced apart in a circumferential direction as indicated by the arrows 23-25 designating an angular displacement of each rod 28 with respect to its adjacent rod.

The plurality of rods 28 are spaced apart by a measure of preferably seven and one half degrees (7½°) for a guard that is three feet (3') long and four feet (4') in diameter. Arrows 26-27 in FIG. 2 show the angular displacement between adjacent rods 28. Each of the rods 28 meets at the center 36 front 12 of guard 10 and at the central longitudinal axis 13 thereof as shown in FIGS. 1 and 2.

Each rod 28 forms an angle of preferably thirty degrees (30°) with reference line 30 and also with central longitudinal axis 13. Reference line 30 is a longitudinally extending line that begins at base ring 17 and extends away from base ring 17 along a line that is parallel to longitudinal central axis 13. Arrow 29 in FIG. 1 defines the angular displacement of preferably thirty degrees (30°) formed by each longitudinally extending rod 28.

Figure 3:
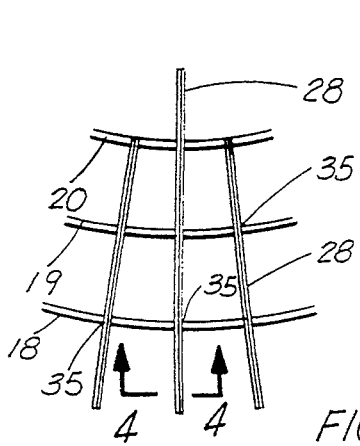
FIG. 3 is a fragmentary view of the preferred embodiment of the apparatus of the present invention.

In FIG. 3, a fragmentary view shows rods 28 overlapping the generally circular wire rings 18-20. Welds 35 can be provided at the intersection of a rod 28 with a generally circular ring 18-22. The rods 28 are positioned externally of the rings 18-22 relative to the central longitudinal axis 13.

Figure 4:
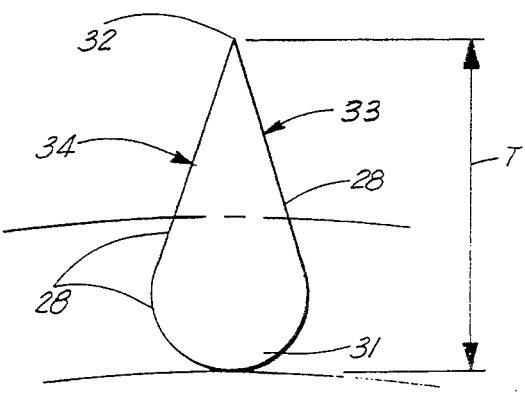
FIG. 4 is a fragmentary enlarged view of one of the longitudinally extending bars shown in transverse section.

In FIG. 4, a detailed fragmentary view of a particular rod 28 is shown in transverse section. Each rod 28 includes a rounded portion 31 that is generally hemispherically shaped and a pointed end portion 32. The rounded portion 31 faces to the rear during use. The pointed end portion 32 faces to the front during use. The front pointed end 32 of each rod 28 faces toward the front of the overall guard 10 so that the rods provide sharp surfaces that would slice foreign objects upon impact and have neglible effect on airflow. Each of the rod 28 would preferably be one half inch in width.

A pair of angularly spaced flat surfaces 33, 34 form an angle of approximately thirty two degrees (32°). The arrow "T" in FIG. 3 defines the overall thickness of a particular longitudinally extending rod 28. In the preferred embodiment, the dimension "T" can be between one eight inch (⅛") and one half inch (½"). The entire apparatus 10 an be of a plurality of titanium rods welded together in the configuration shown and described.

The following table lists the part numbers and part descriptions as used herein and in the drawings attached hereto.

| PARTS LIST | |
|---|---|
| Part Number | Description |
| 10 | guard apparatus |
| 11 | engine cowl |
| 12 | front |
| 13 | central longitudinal axis |
| 14 | convex surface |
| 15 | radius |
| 16 | arrow |
| 17 | base ring |
| 18 | circular wire ring |
| 19 | circular wire ring |
| 20 | circular wire ring |
| 21 | circular wire ring |
| 22 | circular wire ring |
| 23 | angle |
| 24 | angle |
| 25 | angle |
| 26 | arrow |
| 27 | arrow |
| 28 | longitudinally extending rod |
| 29 | arrow |
| 30 | longitudinal line |
| 31 | rounded portion |
| 32 | pointed end portion |
| 33 | flat portion |
| 34 | flat portion |
| 35 | weld |
| 36 | center |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A jet engine intake guard apparatus comprising:
   a) a generally circular base ring member adapted for connection to an engine cowl of a jet engine;
   b) a plurality of longitudinally extending rods, each of said rods having an asymmetrical cross section that includes a pointed front portion and a generally curved convex rear surface;

c) a plurality of spaced apart concentric rings forming connections to the plurality of longitudinally extending rods, each of the concentric rings being of a progressively smaller diameter, and the concentric rings being positioned in spaced apart position from the base ring to the front end portion of the guard apparatus;

d) the smallest ring carrying a hemispherically shaped front end portion of the guard apparatus;

e) wherein the apparatus defines a central longitudinal axis and the plurality of longitudinally extending rods each form an acute angle with the longitudinal central axis.

2. The apparatus of claim 1 wherein the longitudinally extending rods are circumferentially spaced apart by a measure of less than ten degrees (10°).

3. The apparatus of claim 1 wherein longitudinally extending the rods include a pointed edge portion that is spaced radially away from the rounded portion of each rod.

4. The apparatus of claim 1 wherein each of the rods includes a pair of flat surfaces that are angularly spaced apart by a measure that is an acute angle.

5. The apparatus of claim 4 wherein each of the rods includes a generally semicircular shaped portion in transverse cross section.

* * * * *